United States Patent [19]

Deal et al.

[11] 4,425,377

[45] Jan. 10, 1984

[54] METHOD OF MAKING A CATHODE-RAY TUBE HAVING A CONDUCTIVE INTERNAL COATING EXHIBITING REDUCED ARCING CURRENT

[75] Inventors: Samuel B. Deal, Lancaster; Donald W. Bartch, Wrightsville, both of Pa.

[73] Assignee: RCA Corporation, New York, N.Y.

[21] Appl. No.: 286,022

[22] Filed: Jul. 22, 1981

[51] Int. Cl.³ .......................... B05D 3/02; B05D 7/22; B05D 5/12; H01J 63/02
[52] U.S. Cl. ........................................ 427/64; 427/106
[58] Field of Search ................................. 427/64, 106

[56] References Cited

U.S. PATENT DOCUMENTS

| 3,518,116 | 6/1970 | Stock et al. | 117/226 |
| 3,532,640 | 10/1970 | Scharrer et al. | 252/506 |
| 3,791,546 | 2/1974 | Maley et al. | 220/2.1 |
| 4,041,347 | 8/1977 | Deal et al. | 313/450 |
| 4,092,444 | 5/1978 | Kilichowski | 427/64 |
| 4,339,475 | 7/1982 | Hinosugi et al. | 427/64 |
| 4,379,762 | 4/1983 | Chiyoda et al. | 427/64 X |

Primary Examiner—James R. Hoffman
Attorney, Agent, or Firm—E. M. Whitacre; D. H. Irlbeck; L. Greenspan

[57] ABSTRACT

In a method of fabricating a cathode-ray tube, a layer comprising graphite, iron oxide, amorphous carbon and silicate binder is deposited on at least a portion of the interior surface of an envelope, the coating is baked in air until the amorphous carbon is substantially entirely gasified, and then the envelope is evacuated of gases and sealed.

7 Claims, 1 Drawing Figure

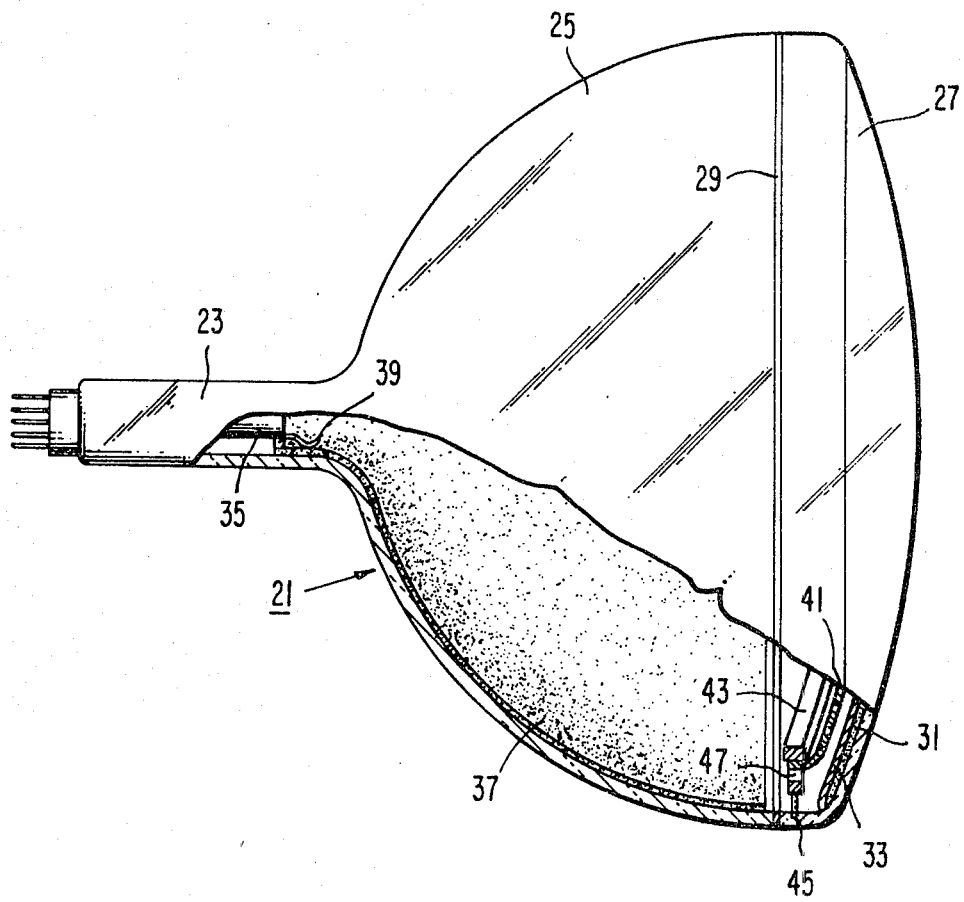

METHOD OF MAKING A CATHODE-RAY TUBE HAVING A CONDUCTIVE INTERNAL COATING EXHIBITING REDUCED ARCING CURRENT

BACKGROUND OF THE INVENTION

This invention relates to a method of making an improved cathode-ray tube having an internal coating or layer comprising particulate graphite, iron oxide and a silicate binder on the interior walls of the tube, and to the product thereof.

Cathode-ray tubes usually have a conductive internal coating or layer on the interior walls of the tube. This coating is used to carry a high potential of the order of 15 to 35 kilovolts, which is applied at the anode button. A common internal coating consists essentially of particulate graphite, particulate iron oxide, and an alkali silicate binder. Examples of such coatings are disclosed in Table 1 of U.S. Pat. No. 4,041,347 issued Aug. 9, 1977 to S. B. Deal et al. The coating is applied to the walls of the tube by spraying and/or brushing as an aqueous coating composition, then dried, and then baked in air at about 400° to 450° C. for about one hour. Subsequently, the tube is baked and exhausted of gases down to a pressure of about $10^{-6}$ torr, and then tipped-off; that is, hermetically sealed. Subsequently, under some conditions of operation, arcs may be produced in the tube in the vicinity of the electron-gun mount assembly. Associated with these arcs is a surge of current in the internal coating which may be damaging to external circuit components that are connected to the coating through the anode button and/or the stem leads of the tube. It is desirable to limit the amount of arcing current passed by the internal coating, at least to levels that do not damage any of the external circuit components. This desire may be achieved through a modification of the method of making the internal coating according to the novel method.

SUMMARY OF THE INVENTION

The novel method is similar to the above-described prior methods except that a quantity of amorphous carbon is included in the applied coating and, when the applied coating is baked in air, the baking is continued until the amorphous carbon is substantially entirely gasified. Thus, the novel method includes depositing on at least a portion of the interior walls of a cathode-ray-tube envelope a layer comprising graphite, iron oxide, amorphous carbon and a silicate binder, baking the layer in air until the amorphous carbon is substantially entirely gasified, and then evacuating and sealing the envelope.

The novel cathode-ray tube is similar to prior cathode-ray tubes except that it is made by the novel method and that is passes lower arcing currents therethrough than prior tubes made without amorphous carbon as described above.

BRIEF DESCRIPTION OF THE DRAWING

The sole FIGURE is a partially broken-away longitudinal view of a novel cathode-ray tube of the invention

DESCRIPTION OF THE PREFERRED EMBODIMENT

The cathode-ray tube illustrated in the sole FIGURE is an apertured-mask-type kinescope. The tube includes an evacuated envelope designated generally by the numeral 21, which includes a neck 23 integral with a funnel 25, and a faceplate or panel 27 joined to the funnel 25 by a seal 29, preferably of a devitrified glass. There is a luminescent layer 31 comprised of a phosphor material on the interior surface of the faceplate 27, and a light-reflecting metal coating 33, as of aluminum metal, on the luminescent layer 31. The luminescent layer 31, when suitably scanned by an electron beam or beams from a gun in a mount assembly 35 located in the neck 23, is capable of producing a luminescent image which may be viewed through the faceplate 27.

There is an electrically-conductive internal coating 37, consisting essentially of a silicate binder, graphite particles, and iron oxide particles, on a portion of the interior surface of the funnel 25 between the mount assembly 35 and the seal 29. Three metal fingers 39 space the mount assembly 35 from the neck wall and connect the forward portion of the mount assembly 35 with the internal coating 37.

Closely spaced from the metal coating 33 toward the mount assembly 35 is a metal mask 41 having a multiplicity of apertures therein. The mask 41 is welded to a metal frame 43 which is supported by springs 47, which are attached to the frame 43, on studs 45 integral with the panel 27. Inasmuch as the invention is concerned primarily with the conductive internal coating 37, a detailed description of the components and parts normally associated with the neck and faceplate 23 and 27 is omitted or shown schematically.

The tube of this example may be fabricated by methods known in the art. The mask 41, frame 43 and springs 47 are assembled to the faceplate 27. The luminescent layer 31 and the metal coating 33 are deposited on the inner surface of the faceplate 27. The conductive internal coating 37 is applied to the interior surface of the funnel 25 and an adjacent portion of the neck 23 as indicated in the sole FIGURE by any convenient method. For example, the internal coating 37 may be applied from an aqueous suspension in two steps. First, a portion is brushed on in the neck 23 and the adjacent portion of the funnel 25, and then a portion is sprayed on in the funnel 25, so that the sprayed-on portion overlaps the brushed-on portion. A typical coating formulation is as follows:

40 grams graphite (90% below 10 microns) such as Dixon #200-39 marketed by Dixon Crucible Company, Jersey City, N.J.

168 grams ferric oxide $Fe_2O_3$ (average particle size about 1.1 microns) such as reagent grade $Fe_2O_3$ marketed by Pfizer, Easton, Pa.

10 grams amorphous carbon (average particle size about 0.021 micron) such as Vulcan XC-72R marketed by Cabot Corp. Boston, Mass.

136 grams aqueous solution containing 54 weight percent sodium silicate (weight ratio $SiO_2/Na_2O$ about 2.0) such as C Brand sodium silicate marketed by Phila. Quartz Co., Phila., Penna.

4 grams dispersant, such as C21 Marasperse marketed by Marathon Products, American Can Co., Greenwich, Ct.

400 grams deionized or distilled water

This formulation has a viscosity of about 20.5 seconds after ball milling for about 6 hours. After application, the coating is dried in air.

Next, a bead of devitrifying glass frit is deposited on the seal land of the funnel 25. The frame 43 with the mask 41 and springs 47 attached thereto is mounted on the studs 45. The seal land of the panel 27 is placed against the bead of frit on the seal land of the funnel 25, and the assembly is heated in air at about 400° to 450° C. until the frit melts and devitrifies and forms a vacuum-tight seal 29 between the panel 27 and the funnel 25. During the heating to form the seal 29, the heat also bakes the funnel coating 37, driving out moisture, gasifying substantially all of the amorphous carbon in the coating 37 and rendering the funnel coating 37 electrically conductive and chemically stable to the atmosphere. Lower temperatures down to about 300° C. may be used to gasify the amorphous carbon and to render the coating chemically stable. During this air baking, a small amount of the graphite, probably the very finest graphite particles, is also gasified. However, the bulk of the graphite remains unchanged, and the weight ratio of graphite to silicate binder is lowered only a small insignificant amount.

The mount assembly 35 is inserted into the neck 23 and slid into the tube until the mount assembly 35 is at the desired position. The fingers 39 are depressed and slide on a portion of the coating 37 during this step. Next, the glass stem is sealed to the neck 23. Finally, the entire tube is baked at about 440° C., the hot tube is exhausted and then is sealed. During this last baking step, moisture, water vapor, carbon dioxide and possibly other gases that are present in the funnel coating 37 are largely removed. This last baking may be conducted at temperatures as low as 300° C. with substantially the same beneficial effects with respect to the internal coating.

SOME GENERAL CONSIDERATIONS AND ALTERNATIVES

The internal coating may be used in any cathode-ray tube including picture tubes, display tubes, oscilloscopes, camera tubes and storage tubes. The coating is particularly suitable where an adherent conductive coating is desired on the interior glass surfaces of the tube. The conductive internal coating is prepared by applying to the interior surface of the glass funnel 25 a coating of an aqueous suspension of a desired composition, drying the coating and then baking the coating in air at about 300° to 450° C.

The suspension comprises 100 weight parts powdered graphite, about 200 to 600 weight parts iron oxide particles, about 15 to 40 weight parts amorphous carbon and about 50 to 400 weight parts of silicate solids in an aqueous medium. Funnel coatings for use in kinescopes according to the novel method preferably consist essentially of about 100 weight parts graphite, about 300 to 400 weight parts dehydrated ferric oxide, 20 to 30 weight parts amorphous carbon and about 125 to 175 weight parts of sodium silicate solids. A dispersant and water are added in amounts to adjust the coating qualities of the coating formulation as desired. Some suitable dispersants are Marasperse C-21, N-22 and CB (marketed by American Can Co.).

The iron oxide is in anhydrous form and may be any oxide of iron, such as ferric oxide $Fe_2O_3$, ferrous oxide FeO, or ferroso-ferric oxide $Fe_3O_4$. The preferred form is ferric oxide $Fe_2O_3$. The particle-size range of the iron oxide is such that about 90% is below 10 microns. The graphite particles may be any of the varities that can be used for making conductive coatings. The particle-size range of the graphite particles is such that about 90% of the particles is below 10 microns.

The silicate binders are in aqueous solutions of about 10 to 65 weight percent solids. The silicate binder may be alkali silicate, preferably silicate of sodium, but may be of potassium or of lithium, or of combinations thereof. Where sodium silicate is used, the $SiO_2$/alkali weight ratio is in the range of 1.6 to 3.8. Where lithium silicate is used, the $SiO_2$/alkali ratio is in the range of 4 to 20. Lower weight ratios of silica to alkali ($Li_2O$ plus $Na_2O$ plus $K_2O$) in the suspensions generally yield coatings that are more adherent to glass but absorb greater amounts of moisture. Higher weight ratios of silica to alkali in the suspensions generally yield coatings that absorb lesser amounts of moisture but are less adherent to glass. Higher weight ratios of $Li_2O$ to $Na_2O$ plus $K_2O$ in the suspensions generally yield coatings that are harder and less absorbent of moisture.

Amorphous carbon was selected for use in preparing the internal conductive coating because of its gasification characteristics. When baked in air, amorphous carbon gasifies at about 300° to 500° C., whereas graphite gasifies at about 650° to 700° C. This is primarily a result of the difference in crystal structures and the great differences in surface areas and particle sizes. Typically, powdered graphite of the type used here has the following values compared to amorphous carbon of the variety used in this invention:

|  | Average Particle Size Microns | Surface Area Sq. Meters per Gram |
| --- | --- | --- |
| Graphite | 2.5 | 0.2 |
| Amorphous Carbon | 0.021 | 245 |

These differences permit selective gasification of the amorphous carbon by baking the coatings in air at about 300° to 450° C., a range which includes conditions frequently used for processing cathode-ray tubes.

A number of amorphous carbons are obtainable commercially and vary over an average particle-size range of 0.01 to 0.1 micron. The particular amorphous carbon chosen for use in this coating is one which has been used for other purposes in cathode-ray tubes and is therefore known to be compatible in processes used to fabricate these tubes. The weight proportion of amorphous carbon used with respect to weight of graphite is governed by coating adherence and effectiveness considerations. At least 15 weight parts of amorphous carbon per 100 parts graphite are required to produce a desirable effect. Proportions of amorphous carbon in excess of 40 weight parts per 100 weight parts graphite result in too great a reduction in adherence of the coating to the glass walls of the cathode-ray tube. Other amorphous carbons that have been used in similar applications here include Carbolac and Black Pearls 74 (both Cabot Corp. materials).

A baking time of approximately 1.5 hours at temperatures above 300° C. in air was employed to gasify the amorphous carbon to essential completion in a test series. This was verified by means of TGA (thermogravimetric analysis).

The constituents of the suspension are mixed together preferably with about 0.1 to 0.3 weight percent of dispersant. The constituents of the coating formulation are mixed together and then ball milled for a period of time, for example about 6 hours. Changing the weight proportions of iron oxide, graphite and silicate binder affects the electrical resistance of the final coating. Increasing the proportion of iron oxide increases the electrical resistance of the finished coating. Increasing the proportion of silicate binder increases the electrical resistance and scratch resistance of the finished coating. Increasing the proportion of graphite decreases the electrical resistance and decreases the scratch resistance of the finished coating. Increasing the proportion of amorphous carbon decreases the arc current, decreases the coating adherence and increases the electrical resistance of the coating. The internal coatings described herein provide a set of practical compromises of the electrical and physical properties needed for their fabrication and use in cathode-ray tubes.

The coating suspension may be applied by any convenient process. It is preferred to brush the coating onto the interior wall of the neck 23 so that a sharply-defined edge is produced opposite the mount assembly 35. It is preferred to spray the coating formulation onto the interior surface of the funnel 25, overlapping the brushed-on portion. Spraying is a rapid process for covering the relatively large funnel area. Either air or airless spraying can be used.

The physical and electrical properties of the internal coating employed in the novel tube and similar prior coatings used in prior tubes have been measured. The accompanying TABLE 1 gives average values and ranges for data for 23 tubes taken in comparative tests on four coatings A, B, C and D, along with the formulations in weight percent on a dry solids basis. Coatings A and C are prior coatings made with no amorphous carbon. Coatings B and D are coatings made according to the novel method with about 3.4 weight percent amorphous carbon present. Coatings C and D both include graphite but no iron oxide. Coatings A and B include both graphite and iron oxide.

TABLE 2 gives the peak arc current in amperes measured for each of the 23 tubes tested. Tube Nos. 1 to 6 used coating A and averaged ($\overline{X}_{1-6}$) about 322 amperes. Tubes No. 7 to 12 used coating B and averaged ($\overline{X}_{7-12}$) about 118 amperes, demonstrating the comparative improvement achieved with the novel method. Tube Nos. 13 to 18 used coating C and averaged ($\overline{X}_{13-18}$) about 487 amperes. Tube Nos. 19 to 23 used coating D and averaged ($\overline{X}_{19-23}$) about 435 amperes, showing a small reduction in arc current, which is not considered significant statistically.

The reasons for the reduction in arc current and the mechanism by which the reduction in arc current is achieved are not fully understood. One theory relates the improvement to increased porosity in the finished coating. However, other methods for achieving increased porosity in finished coatings have not yielded the improvement achieved with the novel method. Such other methods include modifying the spraying technique or adding a material (other than amorphous carbon) which is gasified by baking in air, such as organic plastic. Another theory relates the improvement to increased electrical resistance in the finished coating. However, selecting various combinations of iron oxides and graphites to produce increased electrical resistances in finished coatings has not yielded the improvement achieved with the novel method. Previously, it was believed that all forms of carbon were functionally equivalent in their use in internal funnel coatings for cathode-ray tubes. However, the data demonstrates that graphite and amorphous carbon are capable of producing significantly different properties in these coatings.

TABLE 1

| Coating Code | | A | B | C | D |
| --- | --- | --- | --- | --- | --- |
| Graphite | wt. % | 14.00 | 13.54 | 64.0 | 61.82 |
| Amorphous Carbon | wt. % | 0.00 | 3.4 | 0.00 | 3.4 |
| Iron Oxide | wt. % | 58.86 | 56.86 | 0.00 | 0.00 |
| Sodium Silicate | wt. % | 25.73 | 24.86 | 34.56 | 33.38 |
| Dispersant | wt. % | 1.40 | 1.35 | 1.44 | 1.40 |
| Viscosity - Liquid (seconds - approximate) | | 20.5 | 2.05 | 2.05 | 20.5 |
| Density - Liquid ($g/cm^3$ - approximate) | | 1.30 | 1.30 | 1.19 | 1.19 |
| Thickness - Finished Coating (mils - approximate) | | 0.70 | 0.70 | 0.70 | 0.70 |
| Electrical Resistance - Finished Coating (ohms/inch - approximate) | | 1000 | 5000 | 70 | 100 |

TABLE 2

| Tube No. | Coating Code | Peak Arc Current (Amperes) |
| --- | --- | --- |
| 1 | A | 382 |
| 2 | A | 364 |
| 3 | A | 237 |
| 4 | A | 255 |
| 5 | A | 328 |
| 6 | A | 364 |
| $\overline{X}_{1-6}$ | A | 322 |
| 7 | B | 146 |
| 8 | B | 109 |
| 9 | B | 109 |
| 10 | B | 137 |
| 11 | B | 127 |
| 12 | B | 82 |
| $\overline{X}_{7-12}$ | B | 118 |
| 13 | C | 437 |
| 14 | C | 692 |
| 15 | C | 419 |
| 16 | C | 437 |
| 17 | C | 473 |
| 18 | C | 464 |
| $\overline{X}_{13-18}$ | C | 487 |
| 19 | D | 328 |
| 20 | D | 473 |
| 21 | D | 282 |
| 22 | D | 637 |
| 23 | D | 455 |
| $\overline{X}_{19-23}$ | D | 435 |

What is claimed is:

1. In a method of fabricating a cathode-ray tube including depositing on at least a portion of the interior surface of an envelope a coating comprising graphite, iron oxide and a silicate binder, baking said coating in air and then evacuating and sealing said envelope, the improvement comprising
    (a) including amorphous carbon in said coating in an amount sufficient to be capable of reducing arcing currents passed by said coating during the operation of said cathode-ray tube, and
    (b) baking said coating in air until said amorphous carbon is substantially entirely gasified.

2. The method defined in claim 1 wherein said coating consists essentially of 100 weight parts graphite, about 200 to 600 weight parts iron oxide, about 50 to 400 weight parts silicate binder and about 15 to 40 parts amorphous carbon.

3. The method defined in claim 2 wherein said silicate binder is entirely sodium silicate.

4. The method defined in claim 1 wherein coating is baked in air at about 300° to 450° C.

5. The method defined in claim 1 wherein said coating consists essentially of 100 weight parts graphite, about 300 to 400 weight parts ferric oxide, about 125 to 175 weight parts sodium silicate solids and about 20 to 30 weight parts amorphous carbon.

6. In a method of fabricating a cathode-ray tube comprising an evacuated envelope and an electrically-conductive coating adhered to at least a portion of the interior surface of said envelope, said coating comprising graphite particles, iron oxide particles and an alkali silicate binder therefor, said method including depositing on at least a portion of said interior surface a layer comprising said graphite, said iron oxide, said silicate binder and an aqueous vehicle therefor, drying said layer, baking said layer in air at about 300° to 450° C. and then evacuating and sealing said envelope, the improvement comprising (a) including amorphous carbon in said layer in an amount sufficient to be capable of reducing arcing currents passed by said coating during the operation of said cathode-ray tube, and (b) baking said layer in air for a time period until said amorphous carbon is substantially entirely gasified.

7. The method defined in claim 6 wherein said significant amount of amorphous carbon is about 15 to 40 weight percent of the amount of graphite present.

* * * * *